United States Patent
Lin et al.

(10) Patent No.: US 7,119,150 B2
(45) Date of Patent: Oct. 10, 2006

(54) SILICA-REINFORCED RUBBER COMPOUNDED WITH AN ALKOXYSILANE AND A CATALYTIC ALKYL TIN COMPOUND

(75) Inventors: Chenchy Jeffrey Lin, Hudson, OH (US); William L. Hergenrother, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 238 days.

(21) Appl. No.: 10/435,648

(22) Filed: May 9, 2003

(65) Prior Publication Data
US 2004/0225038 A1 Nov. 11, 2004

(30) Foreign Application Priority Data
Nov. 9, 2000 (WO) .................. PCt/US00/31023

(51) Int. Cl.
C08F 36/04 (2006.01)
C08F 136/04 (2006.01)
(52) U.S. Cl. ............... 525/332.6; 525/331.9; 525/342; 524/267; 524/492; 524/495; 524/110; 524/111; 524/376; 524/378; 524/366

(58) Field of Classification Search ............ 525/332.6, 525/331.9, 332.1, 342, 343, 370; 524/495, 524/492, 493, 267
See application file for complete search history.

(56) References Cited

U.S. PATENT DOCUMENTS

| | | | | |
|---|---|---|---|---|
| 5,112,885 | A * | 5/1992 | Inoue et al. ................. | 423/213 |
| 6,177,495 | B1 * | 1/2001 | Cohen ......................... | 524/262 |
| 6,403,693 | B1 * | 6/2002 | Materne et al. .............. | 524/492 |
| 6,433,065 | B1 * | 8/2002 | Lin et al. ..................... | 524/492 |
| 6,512,035 | B1 * | 1/2003 | Hergenrother et al. ...... | 524/262 |
| 2003/0134969 | A1* | 7/2003 | Schlosser et al. ........... | 524/588 |

FOREIGN PATENT DOCUMENTS

WO  WO 02/38663 A1 * 5/2002

* cited by examiner

Primary Examiner—David W. Wu
Assistant Examiner—Rip A. Lee
(74) Attorney, Agent, or Firm—Michael R. Asam; Meredith E. Palmer

(57) ABSTRACT

Improvements in the tensile mechanical properties and dynamic viscoelastic properties of silica-reinforced sulfur-vulcanized rubbers can be achieved by compounding elastomers with silica, in the presence of a silane and a catalytic amount of an alkyl tin compound at a high compounding temperature.

31 Claims, 1 Drawing Sheet

SILICA-REINFORCED RUBBER COMPOUNDED WITH AN ALKOXYSILANE AND A CATALYTIC ALKYL TIN COMPOUND

FIELD OF THE INVENTION

The invention generally relates to vulcanizable elastomeric compounds containing silica as a reinforcing filler.

BACKGROUND OF THE INVENTION

When producing elastomeric compositions for use in rubber articles, such as tires, power belts, and the like, it is desirable that these elastomeric compositions are easily processable during compounding and have a high molecular weight with a controlled molecular weight distribution, glass transition temperature ($T_g$) and vinyl content. It is also desirable that reinforcing fillers, such as silica and/or carbon black, be well dispersed throughout the rubber in order to improve various physical properties, such as the compound Mooney viscosity, elastic modulus, tangent delta (tan δ), and the like. Rubber articles, especially tires, produced from vulcanized elastomers exhibiting these improved properties will have reduced hysteresis, better rolling resistance, snow and ice traction, wet traction, and improved fuel economy for vehicles equipped with such tires.

With the increasing use of silica as a reinforcing filler for rubber, filler dispersion in rubber stocks has become a major concern. Because polar silanol groups on the surface of silica particles tend to self-associate, reagglomeration of silica particles can occur after compounding, leading to poor silica dispersion and a high compound viscosity. The strong silica filler network results in a rigid uncured compound that is difficult to process in extrusion and forming operations. Previous attempts at preparing readily processable, vulcanizable silica-filled rubber stocks containing natural rubber or diene polymer and copolymer elastomers have focused on the use, during compounding, of bifunctional silica coupling agents having a moiety (e.g., a silyl group) reactive with the silica surface, and a moiety (e.g., a mercapto, amino, vinyl, epoxy or sulfur group) that binds to the elastomer. Well known examples of such silica coupling agents are mercaptosilanes and bis(trialkoxysilylorgano) polysulfides, such as bis(3-triethoxysilylpropyl)tetrasulfide which is sold commercially as Si69 by Degussa. These bifunctional silica coupling agents offer excellent coupling between rubber and silica, resulting in rubbers having improved wet ice skid resistance, rolling resistance and tread wear.

However, there are disadvantages to the use of bifunctional silica coupling agents. For example, the high chemical reactivity of the —SH functions of the mercaptosilanes with organic polymers can lead to unacceptably high viscosities during processing and to premature curing (scorch). The tendency of a rubber compound to scorch makes compounding and processing more difficult. Mixing and milling must be done more quickly, yet at lower temperatures (e.g., 120° C. to 145° C.), so that the compound will not begin to vulcanize before it is shaped or molded. Rubber compounds employing bis(trialkoxysilylorgano)tetrasulfide silica coupling agents, such as Si69, must be mixed at a temperature below 165° C., if an irreversible thermal degradation of the polysulfane function of the coupling agent and premature curing of the mixture are to be avoided. The upper processing temperature limitations of the bifunctional silica coupling agents result in a marked reduction in the mechanical activity of mixing which is essential for an optimum dispersion of the silica throughout the polymer matrix. Therefore, compared with carbon black-filled compositions, tread compounds having good silica dispersion require a longer mixing time at a lower temperature to achieve improved performance, resulting in decreased production and increased expense. Moreover, both bis(trialkoxysilylorgano) polysulfide and mercaptosilane silica coupling agents are expensive.

Another disadvantage of the use of bis(trialkoxysilylorgano) tetrasulfide and mercaptosilane silica coupling agents is that the upper processing temperature limitations result in a relatively slow rate of the chemical reaction between the alkoxysilyl portion of the silica coupling agents and the silica (the alkoxysilane-silica reaction). Because this reaction results in the release of a substantial amount of alcohol, a slow reaction rate results in the presence of unreacted alkoxysilyl groups in the compounded product that are then available to further react with the silica and moisture during storage, extrusion, tire build, and/or curing, resulting in an undesirable increase in the compound viscosity, and a shorter shelf life. Moreover, the continuing reaction in the compound evolves more alcohol, resulting in porous zones or blisters which can form surface defects in the resulting formed rubber articles and/or can impair the dimensional stability of treads during extrusion and tire building. As a result, a low tread strip drawing speed must be maintained to ensure that the drawn product conforms with specifications, resulting in a further decrease in production and concomitant increase in costs.

To address the expense and other problems related to bifunctional silica coupling agents, recent approaches to improving dispersion of silica in rubber compounds have been directed to reducing or replacing the use of such silica coupling agents by employing silica dispersing aids, such as monofunctional silica shielding agents (e.g., silica hydrophobating agents that chemically react with the surface silanol groups on the silica particles but are not reactive with the elastomer) and agents which physically shield the silanol groups, to prevent reagglomeration (flocculation) of the silica particles after compounding. For example, silica dispersing aids, such as alkyl alkoxysilanes, glycols (e.g., diethylene glycol or polyethylene glycol), fatty acid esters of hydrogenated and non-hydrogenated $C_5$ and $C_6$ sugars (e.g., sorbitan oleates, and the like), polyoxyethylene derivatives of the fatty acid esters, and fillers such as mica, talc, urea, clay, sodium sulfate, and the like, are the subjects of EP 890603 and EP 890606. Such silica dispersing aids can be used to replace all or part of expensive bifunctional silica coupling agents, while improving the processability of silica-filled rubber compounds by reducing the compound viscosity, increasing the scorch time, and reducing silica reagglomeration. To achieve a satisfactory cure of the rubber compound, the use of silica dispersing aids includes employing an increased amount of sulfur in a mixing step when curing agents are added to the composition, to replace sulfur that otherwise would have been supplied by a sulfur-containing silica coupling agent.

An advantage of the use of silica dispersing aids during compounding of elastomers with silica is that, unlike the bifunctional silica coupling agents described above, the dispersing aids do not contain sulfur and, thus, they can be used at high temperature, e.g., about 165° C. to about 200° C., in the absence of curing agents, without increasing the risk of premature curing. At these high temperatures, the reaction between the silica and alkoxysilyl groups of alkyl alkoxysilane silica dispersing aids is accelerated, resulting in an increase in the amount of alcohol evolved and evaporated during compounding, and a decrease in evolution of alcohol from the compound during storage, extrusion, curing and tire build.

SUMMARY OF THE INVENTION

Unexpectedly, it has been discovered that improvements in the tensile mechanical properties and dynamic viscoelastic properties of silica-reinforced sulfur-vulcanized rubbers can be achieved by compounding elastomers with silica, in the presence of an alkoxysilane and a catalytic amount of an alkyl tin compound. The alkyl tin compound acts as a catalyst to accelerate the alkoxysilane-silica reaction, and this reaction proceeds more rapidly, the higher the compounding temperature. For example, when mercaptosilane silica coupling agents, such as γ-mercaptoalkyltrialkoxysilanes, are employed with alkyl alkoxysilanes, in the amounts and ratios described below, compounding temperatures can range from about 130° C. to about 200° C., and preferred high compounding temperatures can range from about 155° C. to about 200° C., more preferably about 170° C. to about 200° C., and especially about 170° C. to about 185° C.

In one embodiment, the invention provides a sulfur-vulcanizable elastomeric compound, comprising an elastomer, a reinforcing filler comprising silica or a mixture thereof with carbon black, an alkyl alkoxysilane, a mercaptosilane silica coupling agent, wherein the weight ratio of the mercaptosilane to the alkyl alkoxysilane is a maximum of 0.14:1, a catalytic amount of an alkyl tin compound, and a cure agent comprising an effective amount of sulfur to achieve a satisfactory cure. It has been discovered that a very small amount of the mercaptosilane facilitates binding of silica by the polymer without resulting in premature curing, the alkyl alkoxysilane provides a desirable viscosity for processability, and the alkyl tin compound catalyzes the alkoxysilane-silica reaction binding silica to both silanes. In another embodiment of the invention, the elastomer is functionalized with an alkoxysilane terminal group, and the alkyl tin compound also catalyzes the binding of the silica to the polymer via the terminal group.

In a further embodiment, the invention provides a sulfur-vulcanizable elastomeric compound, comprising an elastomer optionally having an alkoxysilane terminal group, a reinforcing filler comprising silica or a mixture of silica and carbon black, a silica coupling agent selected from the group consisting of about 0.01% to about 1% by weight of a bis(trialkoxysilylorgano)tetrasulfide silica coupling agent, based on the weight of the silica, about 0.1% to about 20% by weight of a bis(trialkoxysilylorgano)disulfide silica coupling agent, based on the weight of the silica, and mixtures thereof, a silica dispersing aid; a catalytic amount of the alkyl tin compound; and a cure agent comprising an effective amount of sulfur to achieve a satisfactory cure. For example, when tetrasulfide or disulfide silica coupling agents are employed with alkyl alkoxysilanes, in the amounts described below, preferred high compounding temperatures can range from 165° C. to about 200° C., more preferably about 170° C. to about 200° C., and especially about 170° C. to about 185° C.

The sulfur-vulcanizable rubber compounds of the invention have longer scorch times, faster curing rates, and a decrease in evolution of ethanol during storage, extrusion, curing and tire build, resulting in less compound porosity with fewer blisters, and a more stable compound viscosity during storage, than similar compounds prepared at high temperature without the alkyl tin catalyst. Rubber compounds produced according to the invention method exhibit improved dynamic viscoelastic properties, especially a lower storage modulus (G') at −20° C., a higher tan δ at 0° C., and a lower tan δ at 50° C. Such properties have been commonly used in the tire industry to predict tire performance in the categories of snow and ice traction (G' at −20° C.), wet traction (tan δ at 0° C.), and rolling resistance (tan δ at 50° C.). Additionally, the rubber compounds of the invention exhibit about a 2% to about a 10% increase in the bound rubber content or about a 1% to about a 10% increase in the tensile modulus at 300% strain, or reduced hysteresis as measured by about a 3% to about a 10% decrease in tan δ at 65° C., compared to a similar compound mixed at the temperature in the absence of the alkyl tin compound. The rubber compounds may further exhibit about a 10% to about a 50% decrease in filler flocculation after compounding, as measured by ΔG', compared to a similar compound mixed at the temperature in the absence of the alkyl tin compound.

The invention also provides a method for making the sulfur vulcanized compounds of the invention, and pneumatic tires having at least one component that comprises the vulcanized compound.

DETAILED DESCRIPTION OF THE INVENTION

Figure 1:
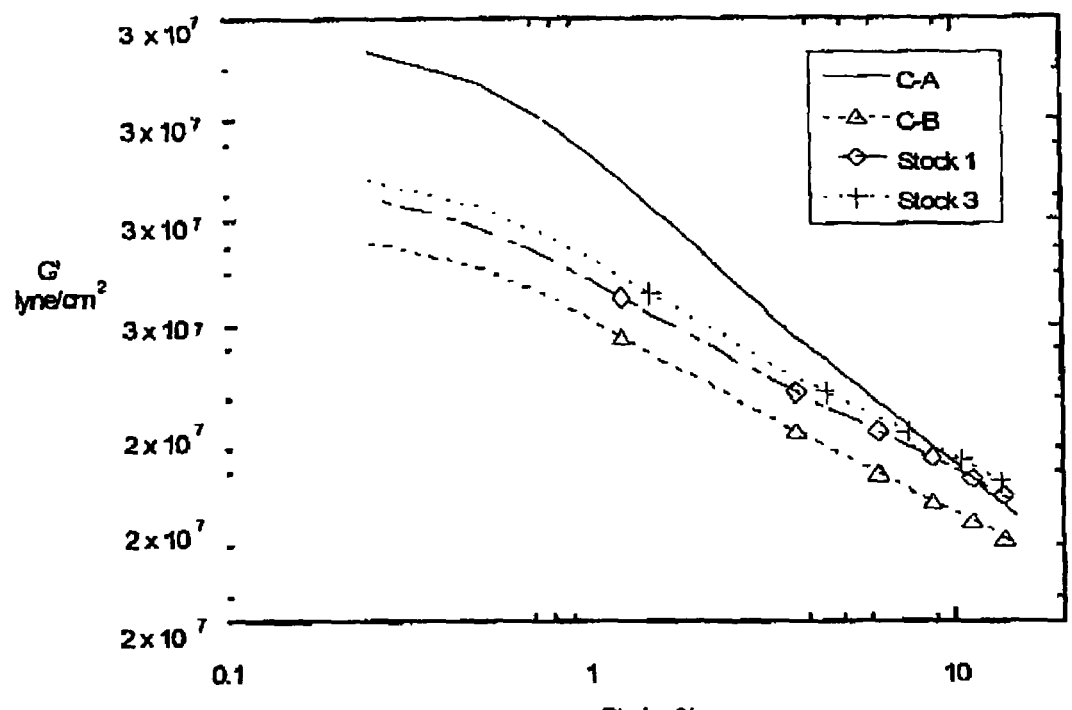
FIG. 1 illustrates the results of a strain sweep test of two cured invention rubber stocks containing an alkyl alkoxysilane, a mercaptosilane, and an alkyl tin catalyst mixed with the elastomer and silica at 175° C., a comparison stock mixed without the alkyl tin catalyst, and a comparison stock containing a conventional amount of Si69 silica coupling agent mixed at 155° C.

The terms elastomer, polymer and rubber are used interchangeably herein, as is customary in the rubber industry. An alkyl tin catalyst, for purposes of this invention, is defined as a monofunctional alkyl tin compound having a first end comprising at least one constituent group that catalyzes the alkoxysilane-silica reaction between silica and a silane, and having a second end comprising a constituent group that is compatible with, but does not form a covalent bond with, the elastomer. For example, the first end can comprise tin in combination with an oxy, carboxylate and/or a halogen group, and the second end can be weakly reactive with the elastomer by hydrogen bonding, van der Waals forces, and the like.

The alkyl tin catalyst suitable for use in the invention compounds has the formula

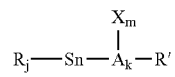

where R is independently selected from the group consisting of primary, secondary and tertiary alkyl groups having 1 to about 30 carbon atoms, alkaryl groups having about 6 to about 30 carbon atoms, and cycloaliphatic groups having about 5 to about 30 carbon atoms; A is independently selected from an oxy group and a carboxylate group; X is a halogen; R' is independently selected from hydrogen, $C_1$ to about $C_{20}$ saturated or unsaturated aliphatics, about $C_5$ to about $C_{20}$ cycloaliphatic, and about $C_6$ to about $C_{20}$ aromatic; "j" is an integer equal to 1 to 3; "m" is an integer equal to zero to 3; and "k" is an integer equal to zero to 3; and (j+k+m) equals 4; and when "k" is 2 or greater, R' optionally forms a bridge between two A groups.

Exemplary alkyl tin compounds suitable for use as catalysts in the invention compounds include, but are not limited to, butyl tin tris(2-ethylhexanoate), bis(2-ethyl-hexanoate) tin, butyl tin chloride dihydroxide, butyl tin hydroxide oxide hydrate, dibutyl tin dilaurate, dibutyl tin dimaleate, and dibutyl tin oxide, or mixtures of the foregoing.

The catalytic amount of the alkyl tin compound in the sulfur-vulcanizable elastomeric compounds of the invention is about 0.01% to about 5% by weight, preferably about 0.05% to about 3% by weight, typically about 0.1% to about 2% by weight, based on the weight of the silica.

The hydrolysis reaction (the alkoxysilane-silica reaction) catalyzed by the alkyl tin compound requires the presence of a silane and silica in the sulfur-vulcanizable elastomeric composition, and is accelerated at high compounding temperatures, especially at temperatures of 155° C. to about 200° C. The silane can be present as an alkoxysilane terminal functional group on the polymer, as an alkoxysilane silica dispersing aid, and/or as a sulfur-containing silica coupling agent, such as a bis(trialkoxysilylorgano) polysulfide, or a mercaptosilane, and the like. In one embodiment of the invention, the elastomer has an alkoxysilane terminal group, and the alkyl tin compound catalyzes the reaction between the silica filler and the alkoxysilane terminal group to increase formation of polymer-filler bonds.

The reaction that binds silica to polymers having one to three (n) alkoxysilane terminal groups is well known and is schematically illustrated below.

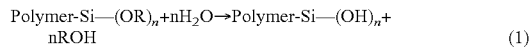

Polymer—Si—(OR)$_n$+nH$_2$O→Polymer—Si—(OH)$_n$+ nROH    (1)

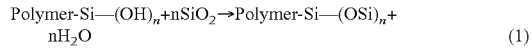

Polymer—Si—(OH)$_n$+nSiO$_2$→Polymer—Si—(OSi)$_n$+ nH$_2$O    (1)

In another embodiment of the invention the —SH groups of the mercaptoalkoxysilane silica coupling agent associate with the polymer during the compounding process and the alkyl tin compound catalyzes the reaction of the silica and the alkoxysilane portion of the mercaptosilane to bind the silica to the polymer. In a preferred embodiment, the elastomer has an alkoxysilane terminal group and both of the foregoing alkoxysilane-silica reactions take place.

The alkoxysilane-silica reaction also occurs in the binding of silica by alkoxysilane silica dispersing aids, and by bis(trialkoxysilylorgano)disulfide silica coupling agents that can be used at high compounding temperatures of about 165° C. to about 200° C. without resulting in premature scorch. The reaction also occurs in the binding of silica by bis(trialkoxysilylorgano)tetrasulfide silica coupling agents, such as Si69, and/or bis(trialkoxysilylorgano)disulfide silica coupling agents and/or mercaptosilane silica coupling agents, and/or alkoxysilane silica dispersing aids at a temperature of 160° C. or less, although the reaction is slower at the lower temperature. It is known that the use of a conventional coupling amount of Si69 (e.g., about 5% to about 20% by weight, based on the weight of the silica) at a temperature of 165° C. or greater results in irreversible thermal degradation of the polysulfane function of the coupling agent and premature curing of the mixture. However, bis(trialkoxysilylorgano)disulfide silica coupling agents; which are structurally similar to the tetrasulfide coupling agents but contain a preponderance of disulfide chains, have better thermal stability because the reaction between the disulfide chain and the polymer only occurs in the presence of added sulfur. (*KGK Kautschuk Gummi Kunststoffe* 53(1), 10–23, February 2000; *Tire Technology International*, pp. 52-59, March 2000). Exemplary of this category of coupling agents are bis(3-triethoxysilylpropyl) disulfide ("TESPD"), containing greater than 80% disulfides, and "VP Si 75", containing about 75% disulfides, both available from Degussa, and Silquest® A1589, containing about 75% disulfides, available from Crompton (formerly Witco).

Moreover, it has been discovered that very small amounts (e.g., about 0.01% to about 1% by weight, based on the weight of the silica) of bis(trialkoxysilylorgano)tetrasulfide silica coupling agents (e.g., Si69) can be mixed with the elastomer and the silica, in the absence of added sulfur and cure agents, at 165° C. to about 200° C., without premature curing of the compound.

In the preferred embodiment, regardless of the source of the silane, the alkyl tin compound catalyzes the alkoxysilane-silica reaction at high compounding temperature to produce rubber compounds having improved tensile mechanical and dynamic viscoelastic properties, compared to similar compounds prepared at the temperature in the absence of the alkyl tin catalyst.

In one embodiment of the invention a sulfur-vulcanizable elastomeric compound of the invention comprises an elastomer optionally having an alkoxysilane terminal group, a reinforcing filler comprising silica or a mixture thereof with carbon black, an alkyl alkoxysilane and a mercaptosilane silica coupling agent, wherein the weight ratio of the mercaptosilane to the alkyl alkoxysilane is a maximum of 0.14:1, a catalytic amount of an alkyl tin compound, and a cure agent comprising an effective amount of sulfur to achieve a satisfactory cure.

To obtain desirable processability, tensile mechanical properties and dynamic viscoelastic properties in the rubber compounds, the weight ratio of the mercaptosilane to the alkyl alkoxysilane is a maximum of 0.14:1, preferably about 0.001:1 to about 0.10:1, typically about 0.01:1 to about 0.10:1. These ratios provide a compound having good processability as a result of the alkyl alkoxysilane silica dispersing aid, and also a satisfactory tensile modulus at 300% strain and bound rubber content, as a result of binding of the silica filler to the polymer by the mercaptosilane. The mercaptosilane is present in the compound in an amount of about 0.0001% to about 3% by weight, typically about 0.001% to about 1.5% by weight, and especially about 0.01% to about 1% by weight, based on the weight of the silica. It has been discovered that the use of such a small amount of the mercaptosilane, even at a high mixing temperature, unexpectedly does not result in premature curing. Therefore, the mercaptosilane and alkyl alkoxysilane can be mixed with the elastomer and silica reinforcing filler in the first stage of the mixing process, at a higher temperature (e.g., about 155° C. to about 200° C., preferably about 170° C. to about 200° C., especially about 170° C. to about 185° C.) than previously allowable for conventional amounts of mercaptosilane coupling agents, resulting in a shorter mixing time with a concomitant savings in production time and expense, and improved performance of the ultimate rubber product. The presence of the alkyl tin catalyst for the alkoxysilane-silica reaction, in addition to the mercaptosilane and alkyl alkoxysilane in the desired weight ratio range, results in an improvement in the tensile modulus, bound rubber content and other tensile mechanical and dynamic viscoelastic properties of the compound because of the acceleration of the alkoxysilane-silica reaction catalyzed by the alkyl tin compound.

The amount of the mercaptosilane and the alkyl alkoxysilane in the compound is based on the weight of silica present, as is known to those skilled in the art of rubber compounding. The alkyl alkoxysilane can be present in an amount of about 0.1% to about 20% by weight, based on the weight of the silica. Preferably, the alkyl alkoxysilane is present in an amount of about 1% to about 15% by weight and, more preferably, in an amount of about 1% to about 10% by weight, based on the weight of the silica.

Mercaptosilanes suitable for use in this embodiment of the invention compounds have the formula

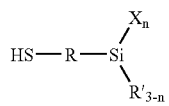

where X is a halogen or an alkoxy; R is $C_1$ to $C_4$ alkylene; R' is independently $C_1$ to about $C_{10}$ alkyl, about $C_7$ to about $C_{30}$ alkaryl, about $C_5$ to about $C_{30}$ cycloaliphatic, or $C_6$ to about $C_{20}$ aromatic; and "n" is an integer from 1 to 3. The halogen can be selected from the group consisting of chlorine, bromine, iodine, and fluorine, preferably chlorine. R is preferably $C_1$ to $C_3$ alkylene, X is preferably an alkoxy, and n is preferably 3.

Exemplary mercaptosilanes include, but are not limited to, 1-mercaptomethyl-triethoxysilane, 2-mercaptoethyltriethoxysilane, 3-mercaptopropyl-triethoxysilane, 3-mercaptopropylmethyldiethoxysilane, 2-mercaptoethyltriproxy-silane, 18-mercaptooctadecyldiethoxychlorosilane, and the like, and mixtures of any of the foregoing.

Alkyl alkoxysilanes suitable for use in the invention compounds have the formula

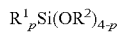

where the alkoxy groups are the same or different from each other, each $R^1$ independently comprises $C_1$ to about $C_{20}$ aliphatic, about $C_5$ to about $C_{20}$ cycloaliphatic, or about $C_6$ to about $C_{20}$ aromatic, each $R^2$ independently comprises $C_1$ to about $C_6$, and p is an integer from 1 to 3. Preferably, at least one $R^1$ contains from 6 to 20 carbon atoms and the remainder of the $R^1$ groups, if any, contain from 1 to 3 carbon atoms. Preferably, $R^2$ contains 1 to 4, more preferably 1 or 2, carbon atoms. Preferably $R^2$ is an alkyl group. More preferably, at least one $R^1$ is much larger in terms of carbon atoms than an $R^2$ contained in the alkoxy groups of the silane.

Exemplary alkyl alkoxysilanes include, but are not limited to, octyl triethoxysilane, octyl trimethoxysilane, trimethyl ethoxysilane, cyclohexyl triethoxysilane, isobutyl triethoxysilane, ethyl trimethoxysilane, cyclohexyl tributoxysilane, dimethyl diethoxysilane, methyl triethoxysilane, propyl triethoxysilane, hexyl triethoxysilane, heptyl triethoxysilane, nonyl triethoxysilane, octadecyl triethoxysilane, methyloctyl diethoxysilane, dimethyl dimethoxysilane, methyl trimethoxysilane, propyl trimethoxysilane, hexyl trimethoxysilane, heptyl trimethoxysilane, nonyl trimethoxysilane, octadecyl trimethoxysilane, methyloctyl dimethoxysilane, and mixtures thereof. Preferably, the alkyl alkoxysilane is an alkyl trialkoxysilane. More preferably, the alkyl alkoxysilane is selected from at least one of n-octyl triethoxysilane, n-hexadecyl triethoxysilane, n-octadecyl triethoxysilane, and methyl n-octyl diethoxysilane.

Although alkyl alkoxysilanes and mercaptosilanes employing methoxysilane groups can be used, it is preferred for environmental reasons that ethoxysilanes are employed, rather than methoxysilanes, because ethyl alcohol, rather than methyl alcohol, will be released when the alkoxysilane portion of the coupling agent reacts with the surface of the silica particle.

In another embodiment of the invention, a sulfur-vulcanizable elastomeric compound comprises an elastomer optionally having an alkoxysilane terminal group; a reinforcing filler comprising silica or a mixture thereof with carbon black; a silica coupling agent selected from the group consisting of about 0.01% to about 1% by weight of a bis(trialkoxysilylorgano)tetrasulfide silica coupling agent, based on the weight of the silica, about 0.1% to about 20% by weight of a bis(trialkoxysilylorgano)disulfide silica coupling agent, based on the weight of the silica, and mixtures thereof; a silica dispersing aid; a catalytic amount of the alkyl tin compound; and a cure agent comprising an effective amount of sulfur to achieve a satisfactory cure. The compound is preferably formed by mixing the elastomer, the silica, the silica coupling agent, the silica dispersing aid and the alkyl tin compound, in the absence of the cure agent, at a temperature of 165° C. to about 200° C. More preferably, the mixing temperature is about 170° C. to about 200° C., especially about 170° C. to about 185° C. The alkyl tin compound and the catalytic amounts employed in the vulcanizable elastomeric composition are the same as those described above.

Exemplary bis(trialkoxysilylorgano)disulfide silica coupling agents suitable for use in the invention include, but are not limited to, 3,3'-bis(triethoxy-silylpropyl) disulfide, 3,3'-bis(trimethoxysilylpropyl)disulfide, 3,3'-bis(tributoxysilylpropyl) disulfide, 3,3'-bis(tri-1-butoxysilylpropyl)disulfide, 3,3'-bis(trihexoxysilyl-propyl) disulfide, 2,2'-bis(dimethylmethoxysilylethyl)disulfide, 3,3'-bis(diphenyl-cyclohexoxysilylpropyl) disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl) disulfide, 3,3'-bis (dimethoxyphenylsilyl-2-methylpropyl)disulfide, and the like, and mixtures of any of the foregoing.

Exemplary bis(trialkoxysilylorgano)tetrasulfide silica coupling agents suitable for use in the invention include, but are not limited to, bis(3-triethoxysilylpropyl) tetrasulfide, bis(2-triethoxysilylethyl)tetrasulfide, bis(3-trimethoxysilylpropyl) tetrasulfide, 3-trimethoxysilylpropyl-N,N-dimethylthio-carbamoyl tetrasulfide, 3-triethoxysilylpropyl-N,N-dimethylthiocarbamoyl tetra-sulfide, 2-triethoxysilyl-N,N-dimethylthiocarbamoyl tetrasulfide, 3-trimethoxysilylpropylbenzothiazole tetrasulfide, 3-triethoxysilylpropylbenzothiazole tetrasulfide, and the like, and mixtures of any of the foregoing. Particularly preferred is bis(3-triethoxysilylpropyl) tetrasulfide.

Similarly to the alkyl alkoxysilanes and mercaptosilanes described above, the bis(trialkoxysilylorgano)tetrasulfide and disulfide silica coupling agents employing methoxysilane groups can be used; however, it is preferred for environmental reasons that ethoxysilanes are employed, rather than methoxysilanes, because ethyl alcohol, rather than methyl alcohol, will be released when the alkoxysilane portion of the coupling agent reacts with the surface of the silica particle.

The bis(trialkoxysilylorgano)disulfide silica coupling agent can be present in the compound in an amount of about 0.1% to about 20% by weight, typically about 0.5% to about 15% by weight, especially about 1% to about 10% by weight, based on the weight of the silica. The bis(trialkoxysilylorgano)tetrasulfide silica coupling agent can be present in the compound in an amount of about 0.01% to about 1% by weight, typically about 0.05% to about 1% by weight, especially about 0.1% to about 1% by weight, based on the weight of the silica.

As discussed below, in all of the embodiments of the invention, the polymer preferably is an elastomer selected from the group consisting of homopolymers of conjugated diene monomers, and copolymers and terpolymers of the conjugated diene monomers with monovinyl aromatic monomers and trienes. Exemplary elastomers include, but are not limited to, polyisoprene, polystyrene, polybutadiene, butadiene-isoprene copolymer, butadiene-isoprene-styrene terpolymer, isoprene-styrene copolymer, and styrene-butadiene copolymer.

Exemplary silica dispersing aids suitable for use in the invention include, but are not limited to an alkyl alkoxysilane, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof, or a mineral or non-mineral additional filler, as described in greater detail below. The alkyl alkoxysilane is the same as described above, and is preferably an alkyl triethoxysilane. It will be appreciated by those skilled in the art, that the total amount of the alkyl alkoxysilane employed in the embodiment of the invention where the silica coupling agent is a mercaptosilane will not exceed the maximum allowed to produce a maximum mercaptosilane/alkyl alkoxysilane ratio of 0.14:1. In the embodiment of the invention employing the bis(trialkoxysilylorgano)disulfide and/or tetrasulfide silica coupling agent, the alkyl alkoxysilane can be present in the compound in an amount of about 0.1% to about 25% by weight, especially about 0.1% to about 15% by weight, based on the weight of the silica.

Exemplary fatty acid esters of hydrogenated and non-hydrogenated $C_5$ and $C_6$ sugars (e.g., sorbose, mannose, and arabinose) that are useful as silica dispersing aids include, but are not limited to, the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO; Capmul® O; Glycomul® O; Arlacel® 80; Emsorb® 2500; and S-Maz® 80. A useful amount of these additional silica dispersing aids when used with the bis(trialkoxysilylorgano) polysulfide silica coupling agents is about 0.1% to about 25% by weight based on the weight of the silica, with about 0.5% to about 20% by weight being preferred, and about 1% to about 15% by weight based on the weight of the silica being more preferred. In the alkyl alkoxysilane and mercaptosilane embodiment of the invention, it may be desirable to use about 0.1% to about 20% by weight of the fatty acid ester based on the weight of the silica. Esters of polyols, including glycols such as polyhydroxy compounds and the like, in the same quantities, are also useful in all invention embodiments.

Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE® (20) sorbitan monooleate, Polysorbate® 80, Tween® 80, Emsorb® 6900, Liposorb® O-20, T-Maz® 80, and the like. The Tween® products are commercially available from ICI Specialty Chemicals. Generally, a useful amount of these optional silica dispersing aids is about 0.1% to about 25% by weight based on the weight of the silica, with about 0.5% to about 20% by weight being preferred, and about 1% to about 15% by weight based on the weight of the silica being more preferred. In the alkyl alkoxysilane and mercaptosilane embodiment of the invention, it may be desirable to use about 0.1% to about 20% by weight of the polyoxyethylene derivative based on the weight of the silica.

The silica coupling agents, the alkyl alkoxysilanes, the fatty acid esters and their polyoxyethylene derivatives, and the alkyl tin catalysts, can be fully or partially supported by the reinforcing filler. The ratio of the dispersing aid or catalyst to the reinforcing filler is not critical. If the dispersing aid is a liquid, a suitable ratio of dispersing aid to filler is that which results in a suitably dry material for addition to the elastomer. For example, the ratio can be about 1/99 to about 70/30, about 20/80 about 60/40, about 50/50, and the like.

Certain additional fillers can be utilized according to the present invention as processing aids, including mineral fillers, such as clay (hydrous aluminum silicate), talc (hydrous magnesium silicate), aluminum hydrate [Al(OH)$_3$] and mica, as well as non-mineral fillers such as urea and sodium sulfate. Preferred micas principally contain alumina and silica, although other known variants are also useful. The foregoing additional fillers are optional and can be utilized in the amount of about 0.5 to about 40 phr, preferably in an amount of about one to about 20 phr and, more preferably in an amount of about one to about 10 phr. These additional fillers can also be used as non-reinforcing fillers to support the alkyl tin catalysts, as well as any of the silica dispersing aids, and silica coupling agents described above. As with the support of the silica dispersing aid on the reinforcing filler, as described above, the ratio of dispersing aid to non-reinforcing filler is not critical. For example, the ratio can be about 1/99 to about 70/30, about 20/80 about 60/40, about 50/50, and the like.

The elastomeric compositions of the invention are preferably compounded with reinforcing fillers, such as silica, or a mixture of silica and carbon black. Examples of suitable silica reinforcing filler include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 m$^2$/g to about 400 m$^2$/g, with the range of about 100 m$^2$/g to about 250 m$^2$/g being preferred, and the range of about 150 m$^2$/g to about 220 m$^2$/g being most preferred.

The pH of the silica filler is generally about 5.5 to about 7 or slightly over, preferably about 5.5 to about 6.8.

Silica can be employed in the amount of about one to about 100 parts by weight per hundred parts of the elastomer (phr), preferably in an amount of about five to about 80 phr and, more preferably, in an amount of about 30 to about 80 phr. The useful upper range is limited by the high viscosity imparted by fillers of this type. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J.M. Huber Corporation.

The elastomers can be compounded with all forms of carbon black in a mixture with the silica. The carbon black can be present in amounts ranging from about one to about 50 phr, with about five to about 35 phr being preferred. The carbon blacks can include any of the commonly available, commercially-produced carbon blacks, but those having a surface area (EMSA) of at least 20 $m^2/g$ and, more preferably, at least 35 $m^2/g$ up to 200 $m^2/g$ or higher are preferred. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention can be in pelletized form or an unpelletized flocculent mass. Preferably, for more uniform mixing, unpelletized carbon black is preferred.

In one embodiment of the invention, the sulfur-vulcanized elastomeric compound of the invention is prepared by the steps of (a) mixing together at a temperature of about 130° C. to about 200° C. in the absence of added sulfur and cure agents, an elastomer optionally having an alkoxysilane terminal group, a reinforcing filler comprising silica or a mixture thereof with carbon black, an alkyl alkoxysilane, and a mercaptosilane, wherein the ratio of the mercaptosilane to the alkyl alkoxysilane is a maximum of 0.14:1, and a catalytic amount of an alkyl tin compound; (b) allowing the mixture to cool below the mixing temperature; (c) mixing the mixture obtained in step (b), at a temperature lower than a vulcanization temperature, with a cure agent and an effective amount of sulfur to achieve a satisfactory cure; and (d) curing the mixture obtained in step (c). The compound is usually cured at about 140° C. to about 190° C. for about 5 to about 120 minutes.

In another embodiment of the invention, a method for preparing a sulfur-vulcanized elastomeric compound, comprises the steps of: (a) mixing together at a temperature of 165° C. to about 200° C. in the absence of added sulfur and cure agents, an elastomer optionally having an alkoxysilane terminal group, a reinforcing filler comprising silica or a mixture thereof with carbon black, a silica coupling agent selected from the group consisting of about 0.01% to about 1% by weight of a bis(trialkoxysilylorgano)tetrasulfide silica coupling agent, based on the weight of the silica, about 0.1% to about 20% by weight of a bis(trialkoxysilylorgano) disulfide silica coupling agent, based on the weight of the silica, and mixtures thereof, a silica dispersing aid, and a catalytic amount of an alkyl tin compound; (b) allowing the mixture to cool below the mixing temperature; (c) mixing the mixture obtained in step (b), at a temperature lower than a vulcanization temperature, with a cure agent and an effective amount of sulfur to achieve a satisfactory cure; and (d) curing the mixture obtained in step (c).

In particular, the initial step in each method embodiment requires that the mixture reaches a temperature from 165° C. to about 200° C., preferably about 170° C. to about 200° C. and, more preferably, about 170° C. to about 185° C. Alternatively, the initial mixing step can include at least two substeps. That is, in the alkyl alkoxysilane and mercaptosilane embodiment, the initial mixing step can comprise the substeps of (i) mixing together at a temperature of about 130° C. to about 200° C., the elastomer, at least a portion of the silica, at least a portion of the alkyl alkoxysilane and at least a portion of the mercaptosilane, and the alkyl tin catalyst, (ii) cooling the mixture below the mixing temperature; and (iii) mixing the mixture obtained in step (ii) with the remainder of the silica, if any, and the remainder of the alkyl alkoxysilane and mercaptosilane, if any, at a temperature of 130° C. to about 200° C. Similarly, in the bis (trialkoxysilylorgano) polysulfide embodiment, the initial mixing step can comprises the substeps of (i) mixing together at temperature of 165° C. to about 200° C., the elastomer, at least a portion of the silica, at least a portion of the bis(trialkoxysilylorgano)disulfide or bis(trialkoxysilylorgano) tetrasulfide silica coupling agent, at least a portion of the silica dispersing aid, and the alkyl tin catalyst; (ii) cooling the mixture below the mixing temperature; and (iii) mixing the mixture obtained in step (ii) with the remainder of the silica, if any, and the remainder of the silica coupling agent and/or the remainder of the silica dispersing aid, if any, at 165° C. to about 200° C. The temperatures achieved by the at least two substeps can be the same or different from each other, within the temperature range. As disclosed above, the preferred temperature range is about 170° C. to about 200° C., especially abut 170° C. to about 185° C.

Each of the methods can further include a remill step in which either no ingredients are added to the first mixture, or non-curing ingredients are added, in order to reduce the compound viscosity and improve the dispersion of the silica reinforcing filler. The temperature of the remill step is typically about 130° C. to about 175° C., especially about 145° to about 165° C.

The final step of the mixing process is the addition of cure agents to the mixture, including an effective amount of sulfur to achieve a satisfactory cure of the final compound. The temperature at which the final mixture is mixed must be below the vulcanization temperature in order to avoid unwanted precure of the compound. Therefore, the temperature of the final mixing step should not exceed about 120° C. and is typically about 40° C. to about 120° C., preferably about 60° C. to about 110° C. and, especially, about 75° C. to about 100° C.

The order of addition of the silica, alkyl alkoxysilane, the mercaptosilane, and the alkyl tin catalyst to the elastomer in the mixer in the initial step of the method is not critical. The alkyl alkoxysilane and/or the mercaptosilane and/or the alkyl tin catalyst can be added prior to or after the addition of the silica to the elastomer. In one embodiment, a portion of the silica and the mercaptosilane and/or the alkyl alkoxysilane are added simultaneously to the mixer. For example, the mercaptosilane and/or the alkyl alkoxysilane can be partially or fully supported on the silica and/or the carbon black reinforcing filler. An exemplary commercial product containing a mercaptosilane supported on silica is available from PPG Industries, as Ciptane® 255LD. The ratio of the amount of supported alkyl alkoxysilane to the filler is not critical. If the alkyl alkoxysilane is a liquid, a suitable ratio of supported silane to filler is that which results in a suitably dry material for addition to the elastomer. For example, the ratio can be about 1/99 to about 70/30, about 20/80, about 60/40, about 50/50, and the like.

Similarly, the order of addition of the silica, bis(trialkoxysilylorgano) tetrasulfide silica coupling agent or bis(trialkoxysilylorgano)disulfide silica coupling agent, silica dispersing aid, and the alkyl tin catalyst to the mixer in the initial step of the method is not critical. The silica coupling agent and/or the alkyl tin catalyst and/or the silica dispersing aid can be added prior to or after the addition of the silica to the elastomer. The silica coupling agent and/or the silica dispersing aid and/or the alkyl tin catalyst can be partially or fully supported on the silica and/or the carbon black reinforcing filler. An exemplary commercial product containing Si69 supported as a 50/50 blend on carbon black is available from Degussa, as X50S. The ratio of the amount of supported silica coupling agent to the filler is not critical.

The use of an alkyl alkoxysilane with a very small amount of mercaptosilane requires an appropriate adjustment in the amount of sulfur added to the elastomeric compound to achieve a satisfactory cure of the compound. In particular, the amount of the mercaptosilane employed in the present invention provides substantially less sulfur than required for a satisfactory cure. Moreover, in the embodiment of the invention wherein a less than conventional amount of of the bis(trialkoxysilylorgano)tetrasulfide silica coupling agent is employed, an adjustment in the amount of sulfur added in the final step of the mixing process is required. An effective amount of sulfur in any of the invention compositions would provide a property of the cured compound that is approximately equal to the same property of a satisfactorily cured compound containing a conventional amount of Si69 (i.e., about 5% to about 20% by weight, based on the weight of the silica). Cured properties for comparison include, but are not limited to, the value of the 300% modulus (psi), the molecular weight between crosslinks ($M_c$, g/mol), and the like, and other cured compound properties that are well known to those skilled in the art of rubber making. The increased amount of sulfur to compensate for the reduced availability of sulfur from the mercaptosilane or bis(trialkoxy-silylorgano)tetrasulfide silica coupling agents will vary from composition to composition, depending on the amount of silica and the amount of silica coupling agent present in the formulation. Based on the disclosure contained herein, and in the examples of invention compositions described below, one skilled in the art of rubber compounding can easily determine the effective amount of sulfur required for a satisfactory cure of the compound without undue experimentation. The additional sulfur can take any form, including soluble sulfur, insoluble sulfur, or any of the sulfur-donating compounds described as vulcanizing agents below, or mixtures of the foregoing.

The compounds produced by the each of the foregoing methods preferably exhibit about a 2% to about a 10% increase in the bound rubber content, and/or about a 1% to about a 10% increase in the tensile modulus at 300% strain, and/or about a 3% to about a 10% decrease in tangent δ at 65° C., and/or about a 10% to about a 50% decrease in filler flocculation after compounding, as measured by ΔG', compared to a similar compound mixed at the temperature in the absence of the alkyl tin catalyst.

The tensile mechanical properties of the invention compounds also are comparable to, or improved over, similar compounds prepared with a conventional amount of a bifunctional silica coupling agent, such as Si69, at 160° C. or less, in the absence of an alkyl alkoxysilane, a mercaptosilane, a bis(trialkoxysilylorgano) disulfide, and an alkyl tin compound.

The present invention can be used in conjunction with any solution polymerizable or emulsion polymerizable elastomer. Solution and emulsion polymerization techniques are well known to those of ordinary skill in the art. For example, conjugated diene monomers, monovinyl aromatic monomers, triene monomers, and the like, can be anionically polymerized to form conjugated diene polymers, or copolymers or terpolymers of conjugated diene monomers and monovinyl aromatic monomers (e.g., styrene, alpha methyl styrene and the like) and triene monomers. Thus, the elastomeric products can include diene homopolymers from monomer A and copolymers thereof with monovinyl aromatic monomers B. Exemplary diene homopolymers are those prepared from diolefin monomers having from about four to about 12 carbon atoms. Exemplary vinyl aromatic copolymers are those prepared from monomers having from about eight to about 20 carbon atoms. Copolymers can comprise from about 99 percent to about 50 percent by weight of diene units and from about one to about 50 percent by weight of monovinyl aromatic or triene units, totaling 100 percent. The polymers, copolymers and terpolymers of the present invention can have 1,2-microstructure contents ranging from about 10 percent to about 80 percent, with the preferred polymers, copolymers or terpolymers having 1,2-microstructure content of from about 25 to 65 percent, based upon the diene content. The elastomeric copolymers are preferably random copolymers which result from simultaneous copolymerization of the monomers A and B with randomizing agents, as is known in the art.

Preferred polymers for use in a vulcanized elastomeric compound of the invention include polyisoprene, polystyrene, polybutadiene, butadiene-isoprene copolymer, butadiene-isoprene-styrene terpolymer, isoprene-styrene copolymer, and styrene-butadiene copolymer.

Anionic polymerization initiators for use in polymerizing the anionically polymerizable monomers include, but are not limited to, organo-sodium, organo-potassium, organo-tin-lithium, organo-lithium, dialkylimido-lithium and cycloalkylimido-lithium initiators. As an example of such initiators, organo-lithium compounds useful in the polymerization of 1,3-diene monomers are hydrocarbyl lithium compounds having the formula RLi, where R represents a hydrocarbyl group containing from one to about 20 carbon atoms, and preferably from about 2 to about 8 carbon atoms. Although the hydrocarbyl group is preferably an aliphatic group, the hydrocarbyl group can also be cycloaliphatic or aromatic. The aliphatic group can be a primary, secondary, or tertiary group, although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octadecyl. The aliphatic group can contain some unsaturation, such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl.

Examples of aromatic hydrocarbyl groups include phenyl, tolyl, phenylethyl, benzyl, naphthyl, phenyl cyclohexyl, and the like.

Specific examples of organo-lithium compounds which are useful as anionic initiators in the polymerization of the monomers listed above, especially conjugated dienes include, but are not limited to, n-butyl lithium, n-propyl lithium, iso-butyl lithium, tert-butyl lithium, tributyl tin lithium (described in co-owned U.S. Pat. No. 5,268,439), amyl-lithium, cyclohexyl lithium, and the like. Other suitable organo-lithium compounds for use as anionic initiators are well known to those skilled in the art. A mixture of different lithium initiator compounds also can be employed. The preferred organo-lithium initiators are n-butyl lithium, tributyl tin lithium and "in situ" produced lithium hexamethyleneimide initiator prepared by reacting hexamethyleneimine and n-butyl lithium (described in co-owned U.S. Pat. No. 5,496,940).

The amount of initiator required to effect the desired polymerization can be varied over a wide range depending upon a number of factors, such as the desired polymer molecular weight, the desired 1,2- and 1,4-content of the polydiene, and the desired physical properties for the polymer produced. In general, the amount of initiator utilized can vary from as little as 0.2 millimoles (mM) of lithium per 100 grams of monomers up to about 100 mM of lithium per 100 grams of monomers, depending upon the desired polymer molecular weight.

Polymerization is usually conducted in a conventional solvent for anionic polymerizations, such as hexane, cyclohexane, benzene and the like. Various techniques for polymerization, such as semi-batch and continuous polymerization can be employed.

In order to promote randomization in co-polymerization and to increase vinyl content, a polar coordinator can optionally be added to the polymerization ingredients. Amounts range between about one to about 90 or more equivalents per equivalent of lithium. The amount depends upon the type of polar coordinator that is employed, the amount of vinyl desired, the level of styrene employed and the temperature of the polymerizations, as well as the selected initiator. Compounds useful as polar coordinators are organic and include tetrahydrofuran, linear and cyclic oligomeric oxolanyl alkanes such as 2-2'-di(tetrahydrofuryl) propane, dipiperidyl ethane, hexamethyl phosphoramide, N-N'-dimethyl piperazine, diazabicyclo octane, dimethyl ether, diethyl ether, tributyl amine and the like. The linear and cyclic oligomeric oxolanyl alkane polar coordinators are described in U.S. Pat. No. 4,429,091, the subject matter of which regarding polar coordinators is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; and tertiary amines, such as tetramethylethylene diamine (TMEDA).

Polymerization is begun by charging a blend of the monomer(s) and solvent to a suitable reaction vessel, followed by the addition of the polar coordinator and the initiator previously described. The procedure is carried out under anhydrous, anaerobic conditions. Often, it is conducted under a dry, inert gas atmosphere. The polymerization can be carried out at any convenient temperature, such as about 0° C. to about 150° C. For batch polymerizations, it is preferred to maintain the peak temperature at from about 50° C. to about 150° C. and, more preferably, from about 60° C. to about 100° C. Polymerization is allowed to continue under agitation for about 0.15 hours to 24 hours. After polymerization is complete, the product is terminated by a quenching agent, an endcapping agent and/or a coupling agent, as described herein below. The terminating agent is added to the reaction vessel, and the vessel is agitated for about 0.1 hours to about 4.0 hours. Quenching is usually conducted by stirring the polymer and quenching agent for about 0.01 hours to about 1.0 hour at temperatures of from about 20° C. to about 120° C. to ensure a complete reaction. Polymers terminated with an alkoxysilane functional group, as discussed herein below, are subsequently treated with alcohol or other quenching agent.

Lastly, the solvent is removed from the polymer by conventional techniques such as drum drying, extruder drying, vacuum drying or the like, which can be combined with coagulation with water, alcohol or steam. If coagulation with water or steam is used, oven drying can be desirable.

One way to terminate the polymerization reaction is to employ a protic quenching agent to give a monofunctional polymer chain. Quenching can be conducted in water, steam or an alcohol such as isopropanol, or any other suitable method. Quenching can also be conducted with a functional terminating agent, resulting in a difunctional polymer. Any compounds providing terminal functionality (i.e., endcapping) that are reactive with the polymer bound carbon-lithium moiety can be selected to provide a desired functional group. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidinones, tin tetrachloride, tributyl tin chloride, carbon dioxide, and mixtures thereof. Further examples of reactive compounds include the terminators described in co-owned U.S. Pat. Nos. 5,521,309 and 5,066,729, the subject matter of which, pertaining to terminating agents and terminating reactions, is hereby incorporated by reference. Other useful terminating agents can include those of the structural formula $(R)_a ZX_b$, where Z is tin or silicon. It is preferred that Z is tin. R is an alkyl having from about 1 to about 20 carbon atoms; a cycloalkyl having from about 3 to about 20 carbon atoms; an aryl having from about 6 to about 20 carbon atoms, or an aralkyl having from about 7 to about 20 carbon atoms. For example, R can include methyl, ethyl, n-butyl, neophyl, phenyl, cyclohexyl or the like. X is a halogen, such as chlorine or bromine, or alkoxy (—OR), "a" is an integer from zero to 3, and "b" is an integer from one to 4, where a+b=4. Examples of such terminating agents include tin tetrachloride, tributyl tin chloride, butyl tin trichloride, butyl silicon trichloride, as well as tetraethoxysilane, $Si(OEt)_4$, and methyl triphenoxysilane, $MeSi(OPh)_3$. The practice of the present invention is not limited solely to these terminators, since other compounds that are reactive with the polymer bound carbon-lithium moiety can be selected to provide a desired functional group.

While terminating to provide a functional group on the terminal end of the polymer is preferred, it is further preferred to terminate by a coupling reaction with, for example, tin tetrachloride or other coupling agent such as silicon tetrachloride or esters. High levels of tin coupling are desirable in order to maintain good processability in the subsequent manufacturing of rubber products. It is preferred that the polymers for use in the vulcanizable elastomeric compositions according to the present invention have at least about 25 percent tin coupling. That is, about 25 percent of the polymer mass after coupling is of higher molecular weight than the polymer before coupling as measured, for example, by gel permeation chromatography. Preferably, before coupling, the polydispersity (the ratio of the weight average molecular weight to the number average molecular weight) of polymers, which can be controlled over a wide range, is from about one to about 5, preferably one to about 2 and, more preferably, one to about 1.5.

As noted above, various techniques known in the art for carrying out polymerizations can be used to produce elastomers polymers suitable for use in the vulcanizable elastomeric compositions, without departing from the scope of the present invention.

The preferred conjugated diene polymers, or copolymers or terpolymers of conjugated diene monomers and monovinyl aromatic monomers, can be utilized as 100 parts of the rubber in the treadstock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber and the like. When the vulcanizable elastomeric composition of the present invention is blended with conventional rubbers, the amounts can vary widely with a lower limit comprising about ten percent to 20 percent by weight of the total rubber. The minimum amount will depend primarily upon the physical properties desired.

Vulcanized elastomeric compounds of the invention are prepared by the method described above. It is readily understood by those having skill in the art that the rubber compound would be compounded by methods generally known in the rubber compounding art, such as mixing the various vulcanizable polymer(s) with various commonly used additive materials such as, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in conventional amounts., in addition to other conventional rubber additives including, for example, other fillers, plasticizers, antioxidants, cure agents and the like, using standard rubber mixing equipment and procedures.

Such elastomeric compositions, when vulcanized using conventional rubber vulcanization conditions, exhibit reduced hysteresis, which means a product having increased rebound, decreased rolling resistance and lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires. Pneumatic tires can be made according to the constructions disclosed in U.S. Pat. Nos. 5,866,171; 5,876, 527; 5,931,211; and 5,971,046, the disclosures of which are incorporated herein by reference. The composition can also be used to form other elastomeric tire components such as subtreads, black sidewalls, body ply skims, bead fillers and the like.

Typical amounts of tackifier resins, if used, comprise about 0.5 to about 10 phr, usually about one to about 5 phr. Typical amounts of compounding aids comprise about one to about 50 phr. Such compounding aids can include, for example, aromatic, naphthenic, and/or paraffinic processing oils. Typical amounts of antioxidants comprise about 0.1 to about 5 phr. Suitable antioxidants, such as diphenyl-p-phenylenediamine, are known to those skilled in the art. Typical amounts of anti-ozonants comprise about 0.1 to about 5 phr.

Typical amounts of fatty acids, if used, which can include stearic acid, palmitic acid, linoleic acid or a mixture of one or more fatty acids, can comprise about 0.5 to about 3 phr. Typical amounts of zinc oxide comprise about one to about 5 phr. Typical amounts of waxes comprise about one to about 2 phr. Often microcrystalline waxes are used. Typical amounts of peptizers, if used, comprise about 0.1 to about 1 phr. Typical peptizers can be, for example, pentachlorothiophenol and dibenzamidodiphenyl disulfide.

The reinforced rubber compounds can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination.

The vulcanization is conducted in the presence of a sulfur vulcanizing agent. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. The sulfur vulcanizing agents are used in an amount ranging from about 0.1 to about 10 phr, more preferably about 1.5 to about 7.5 phr, with a range of about 1.5 to about 5 phr being most preferred.

Accelerators are used to control the time and/or temperature required for vulcanization and to improve properties of the vulcanizate. The vulcanization accelerators used in the present invention are not particularly limited. Examples include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; and guanidine vulcanization accelerators, such as diphenylguanidine (DPG) and the like. The amount of the vulcanization accelerator used is about 0.1 to about 5 phr, preferably about 0.2 to about 3 phr.

Pneumatic tires having an improved tensile mechanical and dynamic viscoelastic properties, and comprising at least one component produced from the sulfur-vulcanized elastomeric compounds of the invention, according to the methods of the invention described above, preferably exhibit about a 2% to about a 10% increase in the bound rubber content, or about a 1% to about a 10% increase in the tensile modulus at 300% strain, or reduced hysteresis as measured by about a 3% to about a 10% decrease in tan δ at 65° C., compared to a tire component produced from a similar compound mixed at the high temperature in the absence of the alkyl tin compound.

EXAMPLES

The following examples illustrate methods of preparation of the vulcanizable elastomeric composition of the present invention. However, the examples are not intended to be limiting, as other methods for preparing these compositions and different compounding formulations may be determined by those skilled in the art without departing from the scope of the invention herein disclosed and claimed.

Example 1

Synthesis of Tin-Coupled TEOS-Terminated SBR

This polymer is a solution styrene-butadiene rubber (SBR) copolymer, in which some of the polymer chains are tin-coupled and others are terminated with an tetraethoxysilane (TEOS) functionalizing agent to produce an ethoxysilane terminated polymer, P—Si—(OEt)$_3$ This polymer was used to prepare the five rubber stocks listed in Tables 1 and 2.

To a one gallon reactor was charged 0.07 kg of hexane, 0.41 kg of 33.0 percent by weight styrene in hexane, and 1.74 kg 22.4 percent by weight butadiene in hexane. Then, 0.28 ml of 1.6 M 2-2'-di(tetrahydrofuryl)propane in hexane, 0.63 ml of 0.6 M potassium t-amylate in hexane, 1.42 ml of 3.54 M hexamethyleneimine and 3.93 ml of 1.6 M n-butyl lithium in hexane were charged into the reactor, and the jacket temperature was set at 122° F. After 97 minutes, 2.20 ml of 0.25 M tin tetrachloride in hexane was added to the reactor. Ten minutes later, 2.53 ml of 1.12 M tetraethoxyorthosilicate was added to the reactor. After 15 additional minutes, the cement was discharged from the reactor, coagulated with isopropanol, treated with DBPC, and drum dried. The properties of the polymer were: ML$_{1+4}$=52.4; percent chain coupling=74.5%; M$_n$=1.50×10$^5$.

Example 2

In order to demonstrate the methods of preparation and properties of the vulcanized elastomeric compounds of the invention, the five stocks employing the tin-coupled TEOS-terminated rubber prepared in Example 1 were compounded using the compounding formulations and mixing conditions shown in Tables 1 and 2. Each of the invention stocks was compounded with silica and the other ingredients, in the master batch stage to a temperature of 175° C., and then cooled and remilled to a temperature of 155° C., prior to adding the curatives and sulfur in the final mixing stage.

As illustrated in Tables 2 and 3, invention stocks 1, 2 and 3 were rubber stocks compounded with silica, octyl triethoxysilane (OTES), and 3-mercaptopropyltriethoxysilane (MS) at a ratio of MS:OTES of 0.067:1, and an alkyl tin catalyst in the master batch stage to an achieved temperature of 175° C. For comparison, example C-A was the same rubber compounded with silica and the silica coupling agent, Si69, in the absence of MS and OTES and the alkyl tin catalyst. In this comparison stock (C-A), the Si69 was mixed with the other ingredients in the remill stage to an achieved temperature of 155° C., in order to avoid premature curing which would occur at a temperature greater than 160° C. Comparison stock C-B was the same rubber compounded with silica and OTES and MS in the master batch stage at high temperature, in the absence of the alkyl tin catalyst.

The 3-mercaptopropyltriethoxysilane (MS) was used in liquid form or in the form of Ciptane® 255 LD from PPG Industries, which is MS carried on silica. When Ciptane® was employed, the amount of silica added to the compound was adjusted to maintain a total silica amount of 30 phr.

The total sulfur content of each of the invention stocks 1, 2 and 3, and comparison stock C-B, was adjusted to compensate for the reduction in the amount of sulfur in comparison with that donated by the Si69 in C-A.

All of the compounded final stocks prepared as described above were sheeted and subsequently annealed at 171° C. for 15 minutes.

TABLE 1

Formulations of Stock Rubbers

| Ingredient | Amount (phr) |
|---|---|
| Solution SBR, tetraethoxysilane (TEOS)-terminated, tin-coupled | 75 |
| Natural Rubber | 25 |
| Carbon Black (SAF) | 35 |
| Precipitated Silica | 30 |
| Silica coupling agent* | varied |
| Alkyl alkoxysilane, OTES** | varied |
| Alkyl Tin Catalyst | varied |
| Naphthenic Process Oil | 15 |
| Wax | 1.5 |
| Antioxidant, N-(1,3-dimethylbutyl)-N'-phenyl-p-phenylene-diamine | 0.95 |
| Sulfur | varied |
| Accelerator, N-cyclohexyl-2-benzothiazylsulfenamide (CBS) | 1.5 |
| Zinc Oxide | 2.5 |
| Diphenyl guanidine | 0.5 |

*Si69 liquid (Degussa); or liquid 3-mercaptopropyl triethoxysilane or 3-mercaptopropyl triethoxysilane carried on silica (Ciptane ® 255LD from PPG Industries)
**OTES = n-octyltriethoxysilane

TABLE 2

Mixing Conditions

| | |
|---|---|
| Mixer | 310 g Brabender |
| Agitation Speed | 60 rpm |
| *Master Batch Stage* | |
| Initial Temperature | 100° C. |
| 0 seconds | charging polymers |
| 30 seconds | charging carbon black, silica, alkyl tin catalyst (if added), mercaptosilane (if added), alkyl alkoxysilane (if added), additional silica dispersing aids (if used), all pigments, oils, and waxes |
| 5 minutes | drop |
| Drop Temperature | 175° C. |
| *Remill Stage* | |
| Initial Temperature | 70° C. |
| 0 seconds | charging master batch stock |
| 30 seconds | charging Si69 (if added), charging remainder of silica (if any) |
| Drop Temperature | 155° C. |
| *Final Batch Stage* | |
| Initial Temperature | 90° C. |
| 0 seconds | charging remilled stock |
| 30 seconds | charging cure agent and accelerators |
| Drop Temperature | 105° C. |

TABLE 3

Ingredients Used In The Rubber Stocks

| Stock Number | Si69 (phr) | Mercaptosilane (phr) | Octyl triethoxysilane (phr) | Bis(2-ethylhexanoate) tin (phr) | Dibutyl tin dilaurate (phr) | Dibutyl tin oxide (phr) | Sulfur (phr) |
|---|---|---|---|---|---|---|---|
| C-A | 3 | 0 | 0 | 0 | 0 | 0 | 1.7 |
| C-B | 0 | 0.2 | 3 | 0 | 0 | 0 | 2.5 |
| Invention Stock 1 | 0 | 0.2 | 3 | 0.5 | 0 | 0 | 2.5 |
| Invention Stock 2 | 0 | 0.2 | 3 | 0 | 0.5 | 0 | 2.5 |
| Invention Stock 3 | 0 | 0.2 | 3 | 0 | 0 | 0.5 | 2.5 |

TABLE 4

The green stock Mooney viscosity and cure characteristics

| Stock Number | Mooney @ 130° C. | $t_5$ scorch @ 130° C. (min) | $t_{s2}$ @ 171° C. (min) | $t_{90}$ @ 171° C. (min) | ML @ 171° C. | Bound Rubber Content % |
|---|---|---|---|---|---|---|
| C-A | 71.2 | 18.50 | 1.79 | 13.58 | 2.52 | 60.57 |
| C-B | 78.4 | 20.50 | 1.86 | 6.13 | 2.53 | 64.17 |
| Invention Stock 1 | 77.6 | 19.43 | 2.01 | 3.79 | 2.51 | 66.32 |
| Invention Stock 2 | 84.1 | 18.92 | 1.97 | 5.02 | 3.81 | 68.71 |
| Invention Stock 3 | 83.9 | 19.68 | 2.00 | 5.09 | 3.19 | 67.21 |

Example 3

The green stock (i.e., the stock obtained after the final stage, prior to curing) was characterized as to Mooney viscosity and Payne effect (Δ G') and cure characteristics. The Mooney viscosity measurement was conducted at 130° C. using a large rotor, and was recorded as the torque when rotor had rotated for 4 minutes. The stocks were preheated at 130° C. for 1 minute before the rotor was started. The $t_5$ is the time required for the viscosity to increase by five Mooney units during a Mooney scorch measurement. It is used as an index to predict how fast the compound viscosity will increase during processing (e.g., during extrusion). The Payne effect (ΔG') was measured using an RPA 2000 viscometer (Alpha Technologies). The strain sweep test (ΔG') was conducted at 50° C. at 0.1 Hz using strain sweeping from 0.25% to 1000%.

As illustrated in Table 4, a higher bound rubber content was obtained in comparison stock C-B, containing the mercaptosilane and the OTES, in the absence of an alkyl tin catalyst, in comparison to stock C-A which employs Si69 alone. Moreover, the presence of small amounts of alkyl tin compounds in invention stocks 1, 2 and 3 results in a further increase in the bound rubber content. Without being bound by theory, it is believed that the alkyl tin catalysts promote the silica-siloxane interaction between the TEOS-terminated polymer and the filler. The compound Mooney viscosity of comparison stock C-B containing the mercaptosilane and the OTES, in the absence of an alkyl tin catalyst, is 10% to 15% higher than that of stock C-A which employs Si69 alone. However, the value is within a satisfactory range. A lower Mooney viscosity can be achieved by the addition of more OTES and/or adding another silica dispersing aid, such as sorbitan monooleate or a polyoxyethylene derivative, such as Tween®80, according to the teachings described hereinabove.

A Monsanto Rheometer MD2000 was used to characterize the stock curing process, at a frequency of 1.67 Hz and a strain of 7% at 171° C. The measurements $t_{s2}$ and $t_{90}$ are the times taken for an increase in torque of 2% and 90%, respectively, of the total torque increase during the cure characterization test. These values are useful in predicting the speed of the viscosity increase ($t_{s2}$) and the cure rate during the cure process ($t_{90}$).

The $t_5$ scorch time and the $t_{s2}$ of the invention stocks 1, 2 and 3 are longer than those of the comparison Si69 stock, C-A, and the addition of the tin compounds in these invention stocks does not alter the longer scorch time of the mercaptosilane and OTES containing stock C-B. The desirable scorch time exhibited by the tin-containing stocks affords the advantage of a longer processing time window, especially during extrusion, while the longer $t_{s2}$ allows a longer time to flow and fill the mold. The fast curing rates of the mercaptosilane and OTES stock (C—B) compared to that of C-A, and the even faster curing rates of the tin catalyst-containing stocks, is another advantage.

Example 4

Figure 2:
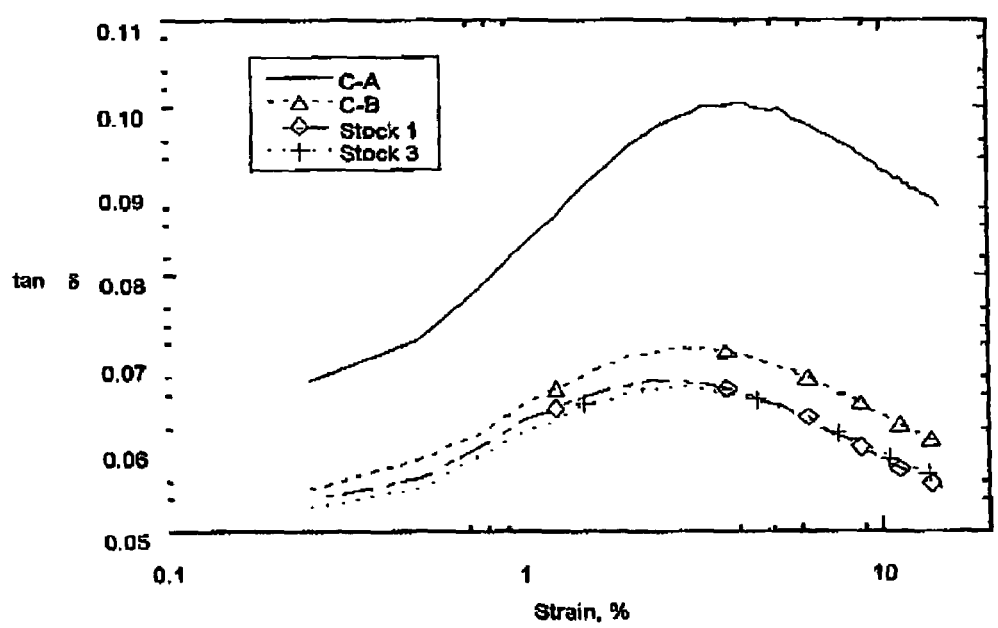
FIG. 2 illustrates the results of a strain sweep test showing the tan δ of the stocks illustrated in FIG. 1.

To further study the Payne effect, strain sweep studies of the five cured stocks were conducted at 65° C. at a frequency of 3.14 radians/second, and a strain sweeping from 0.25% to 14.75%. The strain sweep spectra and tan δ spectra, of invention stocks 1 and 3 and comparison stocks C-A and C-B, are illustrated in FIG. 1 and FIG. 2, respectively. The data obtained from the strain sweep for the Payne effect (ΔG') and tan δ at 7% strain are listed in Table 5.

As illustrated in FIG. 1, the G' (modulus) of invention stocks 1 and 3, containing MS, OTES and an alkyl tin catalyst, and comparison stock C-B, containing MS and OTES in the absence of the tin catalyst, are all substantially lower than comparison stock C-A, containing Si69, indicating decreased filler network structures due to silica shielding by the alkyl alkoxysilane. However, the difference between the G' curves of invention stocks 1 and 3, and comparison stock C-A, becomes smaller and smaller as the strain increases, becoming higher than the G' of C-A at a strain over 10%. In contrast, the G' curve of the stock containing MS and OTES in the absence of the alkyl tin catalysts (C-B) approaches that of C-A at a strain of about 10%. These G' curve comparisons indicate that more constraints that resist deformation are formed in the invention stocks 1 and due to the presence of the alkyl tin catalysts, than in the comparison stock not containing an alkyl tin catalyst (C-B). While not being bound by theory, it is believed that the increase in constraints formed in the MS/OTES stock containing the alkyl tin catalyst is due to the enhancement of the alkoxysilane-silica reaction between the TEOS-terminated polymer and the filler catalyzed by the tin compound. However, the presence of a small amount of mercaptosilane in the alkyl alkoxysilane-containing stock C-B at high temperature also promotes the formation of such constraints. The more constraints formed in the rubber can also result in lower hysteresis, as seen in FIG. 2, where the tan δ of invention stocks 1 and 3 is smaller than that of C-B. However, the tan δ of all the stocks containing MS and OTES, regardless of the presence of the alkyl tin catalyst is much less than that of the Si69 stock C-A.

Example 5

The dynamic viscoelastic mechanical properties of the cured invention and comparison stocks are listed in Table 5, and were obtained from the strain and temperature sweep tests. In particular, the modulus (G') at −20° C. and the tan δ at 0° C. and 50° C. were obtained from temperature sweep tests conducted at a frequency of 31.4 radians/second using 0.5% strain for the temperatures ranging from −100° C. to −10° C. and 2% strain for the temperatures ranging from −10° C. to +100° C. The tan δ's at 0° C. of invention stocks 1 and 3 (MS, OTES and alkyl tin catalyst) and comparison stock C-B (MS and OTES) are higher than the Si69 comparison stock C-A, indicating an improvement in tire wet traction over the Si69 stock. Invention stocks 1, 2 and 3 also show an equivalent or lower modulus (G' at −20° C.) than the Si69 comparison stock, indicating equivalent or improved snow and ice traction. The lower tan δ at 50° C. of invention stocks 1, 2 and 3 and comparison stock C-B will result in decreased rolling resistance.

TABLE 5

The viscoelastic properties measured by temperature and strain sweeps

| Stock Number | Δ G' (MPa) (G'@ 0.25% minus G'@ 14.75%) (S.S.)* | tan δ @ 7% strain @ 65° C. (S.S.) | G' @ −20° C. (MPa) (T.S.)* | tan δ @ 0° C. (T.S.) | tan δ @ 50° C. (T.S.) |
|---|---|---|---|---|---|
| C-A | 0.93 | 0.0968 | 27.2 | 0.2917 | 0.1347 |
| C-B | 0.61 | 0.0669 | 26.8 | 0.3197 | 0.1188 |
| Invention Stock 1 | 0.61 | 0.0620 | 27.24 | 0.3147 | 0.1025 |
| Invention Stock 2 | NA** | NA** | 20.66 | 0.2859 | 0.0835 |
| Invention Stock 3 | 0.62 | 0.0621 | 23.61 | 0.3083 | 0.1064 |

*S.S. = strain sweep test T.S. = temperature sweep test
**NA = not available

The tensile properties for the five stocks were measured using the standard procedure described in ASTM-D 412 at 25° C. The tensile test specimens were round rings with a diameter of 0.05 inches and a thickness of 0.075 inches. A gauge length of 1.0 inches was used for the tensile test. As illustrated by the results of the tensile tests in Table 6, the elastic modulus at the higher strain level (M300) is improved in invention stocks containing the MS, OTES and the alkyl tin catalysts, over the Si69 comparison stock, (C-A), and the results are consistent with the strain sweep results of FIG. 1. The loss of elongation at break and toughness in the invention stocks, suggests that there might be more coupling of the polymer and filler than is necessary. Without being bound by theory, it appears that the alkyl tin catalyst enables the mercaptosilane silica coupling agent to be tied into the filler network more efficiently, and that a reduced amount of mercaptosilane may improve these properties.

TABLE 6

Tensile mechanical properties at 25° C.

| Stock Number | M50 (psi) | M300 (psi) | Strength, Tb (psi) | Elongation at Break, Eb (%) | Toughness (psi) |
|---|---|---|---|---|---|
| C-A | 212 | 2247 | 3042 | 374 | 4595 |
| C-B | 252 | 2643 | 3409 | 361 | 4978 |
| Invention Stock 1 | 205 | 2571 | 2812 | 320 | 3543 |
| Invention Stock 2 | 217 | 2724 | 3433 | 354 | 4807 |
| Invention Stock 3 | 233 | 2850 | 3246 | 324 | 4189 |

In summary, improvements in the bound rubber content and the tensile mechanical properties, especially the elastic modulus, of silica-reinforced sulfur-vulcanized rubbers can be achieved by compounding alkoxysilane-terminated polymers with silica at a temperature of 165° C. to about 200° C., in the presence of an alkyl alkoxysilane, a very small amount of a mercaptosilane (i.e., a ratio of MS to alkyl alkoxysilane of a maximum of 0.14:1), and a catalytic amount of an alkyl tin compound.

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:

1. A sulfin-vulcanizable elastomeric compound, comprising:
   an elastomer optionally having an ailcoxysilatie terminal group;
   a reinforcing filler comprising silica or a mixture thereof with carbon black;
   an alkyl alkoxysilane;
   a mercaptosilane silica coupling agent, wherein the weight ratio of the mercaptosilane to the alkyl alkoxysilane is a maximum of 0.14:1;
   a catalytic amount of an alkyl tin compound; and
   a cure agent comprising an effective amount of suiffir to achieve a satisfactory cure.

2. The compound of claim 1, wherein the alkyl tin compound has the formula

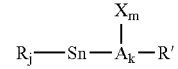

wherein R is independently selected from the group consisting of primary. secondary and tertiary alkyl groups having 1 to about 30 carbon atoms, alkaryl groups having about 7 to about 30 carbon atoms, and cycloaliphatic groups having about 5 to about 30 carbon atoms; A is independently selected from an oxo group and a carboxylate group; X is a halogen; R' is independently selected from hydrogen, $C_1$ to about $C_{20}$ saturated or unsaturated aliphatics, about $C_5$ to about $C_{20}$ cycloaliphatic, and about $C_6$ to about $C_{20}$ aromatic; "j" is an integer equal to 1 to 3; "m" is an integer equal to zero to 3; and "k" is an integer equal to zero to 3; and (j+k+m) equals 4; wherein when "k" is 2 or greater, R' optionally farms a bridge between two A groups.

3. The compound of claim 1, wherein the ailcyl tin compound is selected from the group consisting of butyl tin tris(2-ethylhexanoate), bis(2-ethylhexanoate) tin, butyl tin chloride dihydroxide, butyl tin hydroxide oxide hydrate, dibutyl tin dilaurate, dibutyl tin dimaleate, dibutyl tin oxide, and mixtures thereof.

4. The compound of claim 1, wherein the catalytic amount of the alkyl tin compound is about 0.01% to about 5% by weight, based on the weight of the silica.

5. The compound of claim 4, wherein the catalytic amount of the alkyl tin compound is about 0.05% to about 3% by weight, based on the weight of the silica.

6. The compound of claim 1, wherein the weight ratio of the mercaptosilane to the alkyl alkoxysilane is about 0.001:1 to about 0.10:1.

7. The compound of claim 1, wherein the mercaptosilane is present in an amount of about 0.0001% to about 3% by weight, based on the weight of the silica.

8. The compound of claim 7, wherein the mercaptosilane is present in an amount of about 0.001% to about 1.5% by weight, based on the weight of the silica.

9. The compound of claim 1, wherein the mercaptosilane has the formula $$HS-R-Si\begin{matrix}X_n\\R'_{3-n}\end{matrix}$$

wherein X is a halogen or an alkoxy, R is $C_1$ to $C_4$ alkylene; R' is independently $C_1$ to about $C_{10}$ alkyl, about $C_7$ to about $C_{30}$ alkaryl, about $C_5$ to about $C_{30}$ cycloaliphatic, or $C_6$ to about $C_{20}$ aromatic; and "n" is an integer from 1 to 3.

10. The compound of claim 1, wherein the alkyl alkoxysilane compound has the formula $$R^1_p Si(OR^2)_{4-p}$$

wherein the alkoxy groups are the same or different from each other, each $R^1$ independently comprises $C_1$ to about $C_{20}$ aliphatic, about $C_5$ to about $C_{20}$ cycloaliphatic, or about $C_6$ to about $C_{20}$ aromatic, each $R^2$ independently comprises $C_1$ to about $C_6$, and p is an integer from 1 to 3.

11. The compound of claim 1, wherein the alkyl alkoxysilane is an alkyl trialkoxysitane.

12. The compound of claim 1, further comprising a silica dispersing aid selected from the group consisting of a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, an ester of a polyol, and mixtures thereof.

13. The compound of claim 12, wherein the fatty acid ester is selected from the group consisting of sorbitan monoaleate, sorbitan dioleate, sorbitan trioleate, sorbitan sesquioleate, sorbitan laurate, sorbitan palmitate, sorbitan stearate, and mixtures thereof.

14. The compound of claim 1, wherein the elastomer is selected front the group consisting of homopolymers of conjugated diene monomers, and copolymers and terpolymers of the conjugated diene monomers with monovinyl aromatic monomers and trienes.

15. A pneumatic tire comprising a component produced from a sulfur-vulcanized elastomeric compound that comprises an elastomer optionally having an alkoxysilane terminal group, a reinforcing filler comprising silica or a mixture thereof with carbon black, an alkyl alkoxysilane, a mercaptosilane silica coupling agent, wherein the weight ratio of the mercaptosilane to the alkyl alkoxysilane is a maximum of 0.14:1, a catalytic amount of an alkyl tin compound, and a cure agent comprising an effective amount of sulfur to achieve a satisfactory cure.

16. A method for preparing a sulfur-vulcanized elastomeric compound, comprising the steps of:

(a) mixing together at a temperature of about 130° C. to about 200° C. in the absence of added sulfur and cure agents, an elastomer optionally having an alkoxysilane terminal group, a reinforcing filler comprising silica or a mixture thereof with carbon black, an alkyl alkoxysilane and a mercaptosilane, wherein the ratio of the mercaptosilane to the alkyl ethoxysilane is a maximum of 0.14:1, and a catalytic amount of an alkyl tin compound;

(b) allowing the mixture to cool below the mixing temperature;

(c) mixing the mixture obtained in step (b), at a temperature lower than a vulcanization temperature, with a cure agent comprising an effective amount of sulfur to achieve a satisfactory cure; and (d) curing the mixture obtained in step (c).

17. The method of claim 16, wherein the mixing temperature in step (a) is about 155° C. to about 200° C.

18. The method of claim 17, wherein the mixing temperature in step (a) is about 170° C. to about 185° C.

19. The method of claim 16, wherein the catalytic amount of the alkyl tin compound is about 0.01% to about 5% by weight, based on the weight of the silica.

20. The method of claim 16, wherein the mercaptosilane is present in an amount of about 0.0001% to about 3% by weight, based on the weight of the silica.

21. A sulfur-vulcanizable elastomeric compound, comprising:

an elastomer optionally having an alkoxysilane terminal group;

a reinforcing filler comprising silica or a mixture thereof with carbon black;

a silica coupling agent selected from the group consisting of about 0.01% to about 1% by weight of a bis (trialkoxysilylorgano) tetrasulfide silica coupling agent based on the weight of the silica, about 0.1% to about 20% by weight of a bis(trialkoxysilylorgano) disulfide silica coupling agent, based on the weight of the silica, and mixtures thereof;

a silica dispersing aid selected from the group consisting of a fatty acid ester of a hydrogenated or non-hydrogenated $C_5$ or $C_6$ sugar, and polyoxyethylene derivative of a fatty acid ester of a hydrogenated or non-hydrogenated $C_5$ or $C_6$ sugar, and mixtures thereof;

a catalytic amount of an alkyl tin compound; and a cure agent comprising an effective amount of sulfur to achieve a satisfactory cure.

22. The compound of claim 21, wherein the alkyl tin compound has the formula

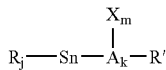

wherein R is independently selected from the group consisting of primary, secondary end tertiary alkyl groups having 1 to about 30 carbon atoms, alkaryl groups having about 6 to about 30 carbon atoms, and cycloaliphatic groups having about 5 to about 30 carbon atoms; A is independently selected from an oxy group and a carboxylate group; X is a halogen; R' is independently selected from hydrogen, ($C_1$ to about $C_{20}$ saturated or unsaturated aliphatics about $C_5$ to about $C_{20}$ cycloaliphatic, and about $C_6$ to about $C_{20}$ aromatic; "j" is an integer equal to 1 to 3; "m" is an integer equal to zero to 3; and "k" is an integer equal to zero to 3; and (j+k+m) equals 4; wherein when "k" is 2 or greater, R' optionally forms a bridge between two A groups.

23. The compound of claim 22, wherein the alkyl tin compound is selected from the group consisting of butyl tin tris(2-ethylhexanoate), bis(2-ethylhexanoate) tin, butyl tin chloride dihydroxide, butyl tin hydroxide oxide hydrate, dibutyl tin dilaurate, dibutyl tin dimaleate, dibutyl tin oxide, and mixtures thereof.

24. The compound of claim 21, wherein the catalytic amount of the alkyl tin compound is about 0.0 1% to about 5% by weight, based on the weight of the silica.

25. The compound of claim 21, wherein the fatty acid ester is selected from the group consisting of sorbitan monooleate, sorbitan dioleate, sorbitan trioleate, sorbitan sesquioleate, sorbitan laurate, sorbitan palmitate, sorbitan stearate, and mixtures thereof.

26. The compound of claim 21, wherein the elastomer is selected from the group consisting of homopolymers of conjugated diene monomers, and copolymers and terpolymers of the conjugated diene monomers with monovinyl aromatic monomers and trienes.

27. A pneumatic tire comprising a component produced from a sulfur-vulcanized elastomeric compound, wherein the compound comprises an elastomer optionally having an alkoxysilane terminal group; a reinforcing filler comprising silica or a mixture thereof with carbon black; a silica coupling agent selected from the group consisting of about 0.01% to about 1% by weight of a bis(trialkoxysilylorgano) tetrasulfide silica coupling agent, based on the weight of the silica, about 0.1% to about 20% by weight of a bis(trialkoxysilylorgano) disulfide silica coupling agent, based on the weight of the silica, and mixtures thereof; a silica dispersing aid selected from the group consisting of a fatty acid ester of a hydrogenated or non-hydrogenated $C_5$ or $C_6$ sugar, a polyoxyethylene derivative of a fatty acid ester of a hydrogenated non-hydrogenated $C_5$ or $C_6$ sugar and mixtures thereof; a catalytic amount of an alkyl tin compound; and a cure agent comprising an effective amount of sulfur to achieve a satisfactory cure.

28. A method for preparing a sulfur-vulcanized elastomeric compound, comprising the steps of:
  (a) mixing together at a temperature of 165° C. to about 200° C. in the absence of added sulfur and cure agents, an elastomer optionally having an alkoxysilane terminal group; a reinforcing filler comprising silica or a mixture thereof with carbon black; a silica coupling agent selected from the group consisting of about 0.01% to about 1% by weight of a bis(trialkoxysilylorgano) tetrasulfide silica coupling agent, based on the weight of the silica, about 0.1% to about 20% by weight of a bis(trialkoxysilylorgano) disulfide silica coupling agent, based on the weight of the silica, and mixtures thereof; a silica dispersing aid; and a catalytic amount of an alkyl tin compound;
  (b) allowing the mixture to cool below the mixing temperature;
  (c) mixing the mixture obtained in step (b), at a temperature lower than a vulcanization temperature, wit a cure agent comprising an effective amount of sulfur to achieve a satisfactory cure; and
  (d) curing the mixture obtained in step (c).

29. The method of claim 28, wherein the mixing temperature in step (a) is about 170° C. to about 200° C.

30. The method of claim 29, wherein the mixing temperature in step (a) is about 170° C. to about 185° C.

31. The method of claim 28, wherein the catalytic amount of the alkyl tin compound is about 0.01% to about 5% by weight, based on the weight of the silica.

* * * * *

UNITED STATES PATENT AND TRADEMARK OFFICE
CERTIFICATE OF CORRECTION

| | | |
|---|---|---|
| PATENT NO. | : 7,119,150 B2 | Page 1 of 1 |
| APPLICATION NO. | : 10/435648 | |
| DATED | : October 10, 2006 | |
| INVENTOR(S) | : Chenchy Jeffrey Lin and William L. Hergenrother | |

It is certified that error appears in the above-identified patent and that said Letters Patent is hereby corrected as shown below:

Please correct column 25, line 7, by deleting the word "aicyl" and substituting the word -- alkyl-- before the word "tin."

Signed and Sealed this

Tenth Day of April, 2007

JON W. DUDAS
*Director of the United States Patent and Trademark Office*